United States Patent [19]
Launder et al.

[11] Patent Number: 5,350,022
[45] Date of Patent: Sep. 27, 1994

[54] ATTACHMENT ASSEMBLY FOR WEAR CAPS RIPPER TEETH

[75] Inventors: Richard L. Launder, Whittier, Calif.; Charles Clendenning, Broken Arrow, Okla.

[73] Assignee: H & L Tooth Company, Montebello, Calif.

[21] Appl. No.: 918,662

[22] Filed: Jul. 22, 1992

[51] Int. Cl.$^5$ .................. A01B 13/08; A01B 23/02
[52] U.S. Cl. .................... 172/700; 172/753; 172/772
[58] Field of Search ............... 172/699, 713, 719, 747, 172/749, 772, 772.5; 37/141 R, 142 R, 141 T; 111/120, 123, 149, 156; 299/79, 91, 94

[56] References Cited

U.S. PATENT DOCUMENTS

| | | | |
|---|---|---|---|
| 3,001,591 | 9/1961 | Johnson | 172/753 X |
| 3,085,635 | 4/1963 | Livermore | 172/699 |
| 3,341,253 | 9/1967 | Hostetter | 299/79 X |
| 3,536,147 | 10/1970 | Norton | 172/753 X |
| 3,704,753 | 12/1972 | Husforth et al. | 172/753 X |
| 3,999,614 | 12/1976 | Rhoads | 172/753 X |
| 4,799,823 | 1/1989 | Williams | 172/719 X |
| 4,867,248 | 9/1989 | Robertson et al. | 172/753 |
| 4,932,478 | 6/1990 | Jones | 172/699 |

Primary Examiner—Clifford D. Crowder
Assistant Examiner—Ismael Izaguirre
Attorney, Agent, or Firm—Lyon & Lyon

[57] ABSTRACT

An attachment assembly for securing ripper teeth to an earth excavation device which comprises a substantially "J"-shaped ripper shank defining a lower forwardly projecting tapered end portion for carrying the tooth, an upper end portion for attachment to the excavation device and a front end wall defining a forwardly projecting elongated securement rib. An elongated wear cap extends over the lower portion of the front end wall of the shank and defines a tapered front digging surface, a lower tapered end portion which merges into the forwardly projecting tapered end portions of the shank and with said portion extends into a cavity in the base of the ripper tooth. The rear surface of the wear cap defines an open channel therein adapted to receive the securement rib on the front end wall of the shank upon the wear cap being transversely slided thereover. A substantially U-shaped securement member is secured to the upper portion of the wear cap and extends about the upper portion of the wear cap and oppositely disposed portions of the side walls of the shank so as to prevent any relative lateral movement between the wear cap and shank.

16 Claims, 2 Drawing Sheets

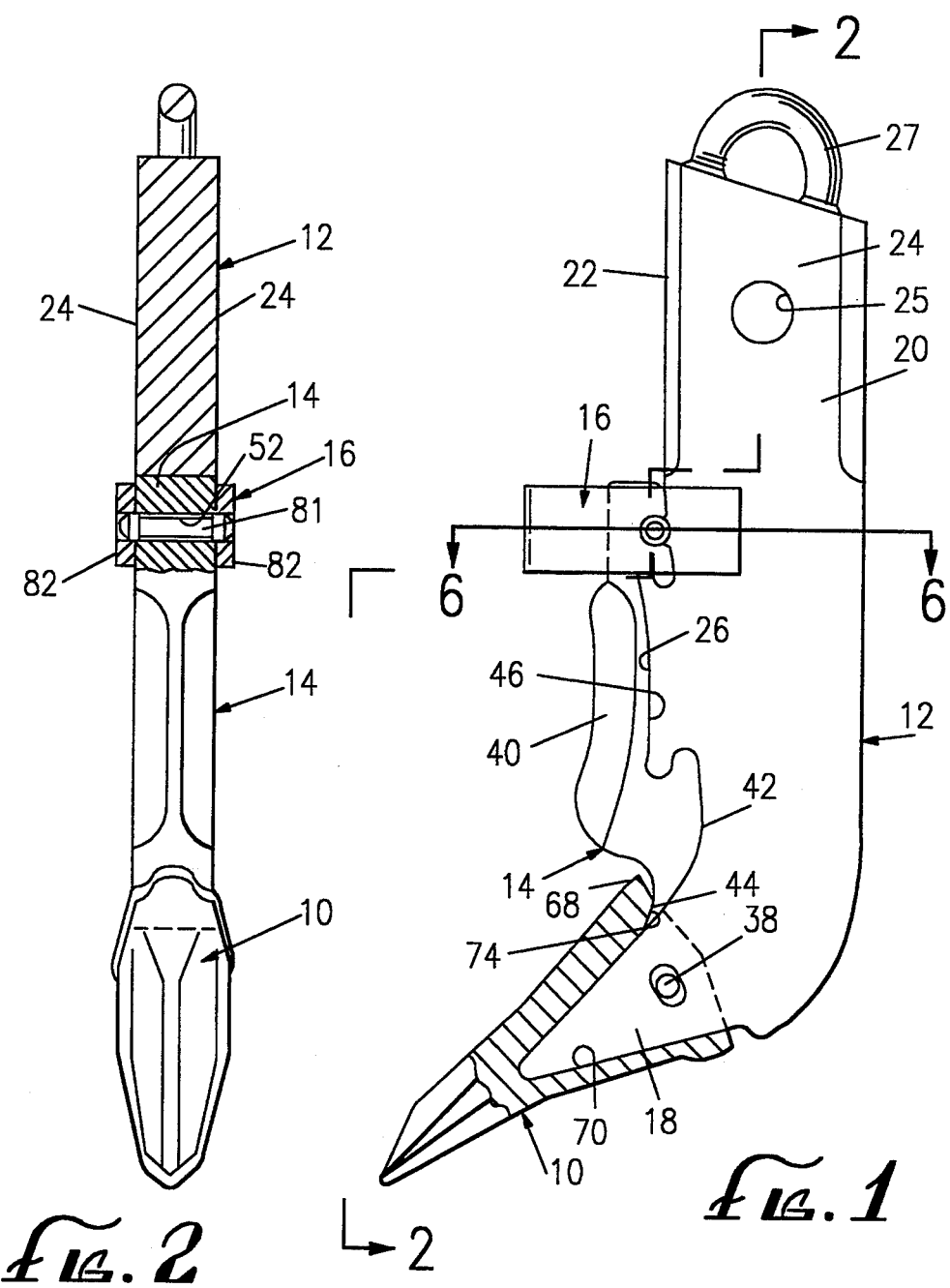
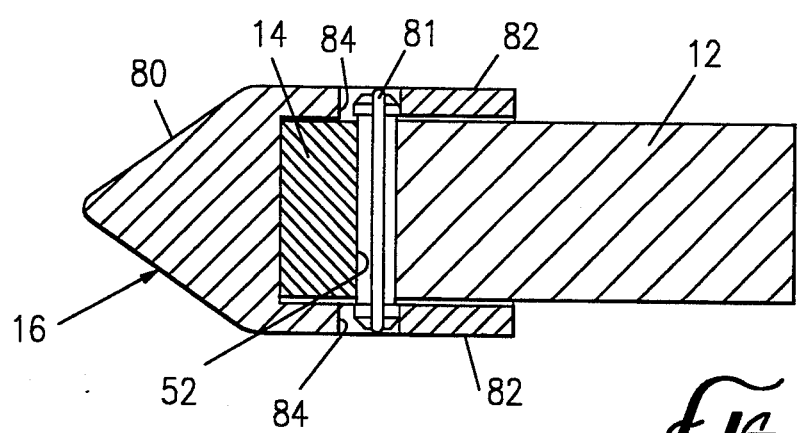
FIG. 2   FIG. 1   FIG. 6

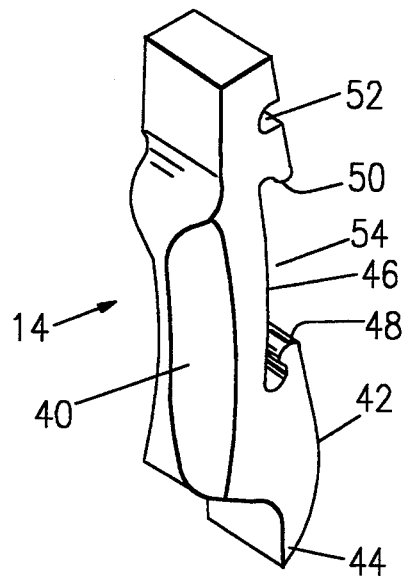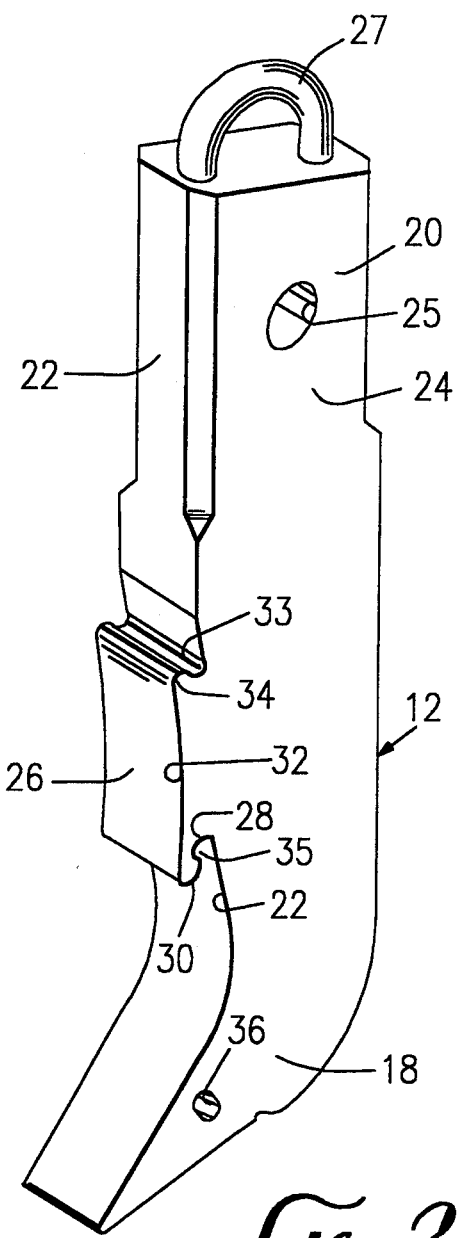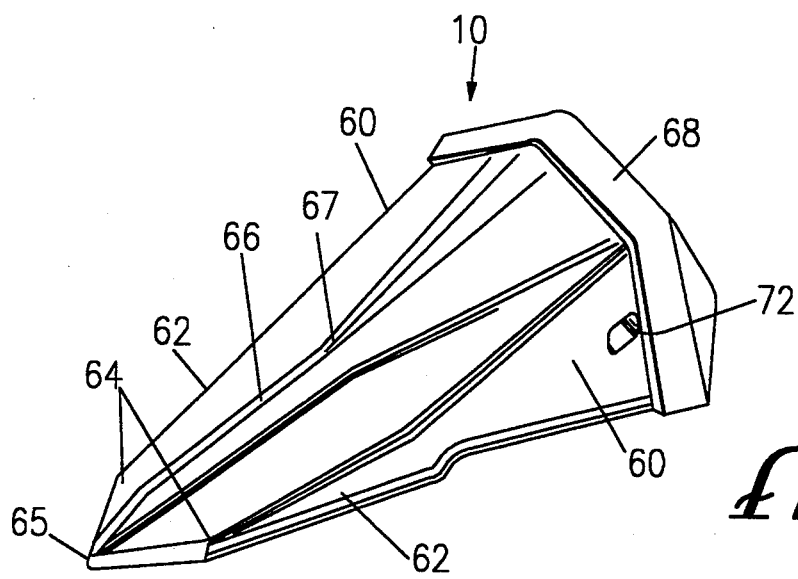

ATTACHMENT ASSEMBLY FOR WEAR CAPS RIPPER TEETH

BACKGROUND OF THE INVENTION

The present invention relates to an attachment assembly for the connection of ripper teeth to wheel or track-type tractors with ripper attachments. More particularly, the invention comprises a novel protective wear cap and ripper shank for reducing the drag of the ripper shank through the ground during use and protecting the shank from wear.

In soil excavation, it is common practice to loosen the soil so that it can be more easily loaded onto a skip loader or carry-all for removal. This is typically accomplished by dragging a plurality of ripper teeth through the soil by means of a wheel or track-type tractor. The tractor is provided with a hydraulically actuated box to which the ripper teeth are secured by means of a corresponding plurality of substantially "J"-shaped adaptors commonly known as ripper shanks. The individual ripper teeth are secured to the lower forward ends of the shanks by means of flex or roll pins. The shanks are in turn secured to the box on the tractor by a wedge key or suitable locking pin. While such a configuration is widely used, it has been found to have certain drawbacks. The forward surface of the ripper shanks, which is flat, creates additional drag for the tractor and is subjected to substantial wear during use, particularly in the area of the shank proximate to the tooth which is dragged through the ground with the tooth. As the shank wears, it becomes susceptible to breakage, requiring replacement.

Because of the costs associated with replacing the larger ripper shanks, wear caps have been developed in an effort to protect the lower portion of the shanks proximate the ripper teeth. These wear caps are generally "U"-shaped in cross section so as to cover the front surfaces of the shanks and they extend about the sides of the ripper shanks where they are secured to the shanks. This configuration results in a widening of the shank which further inhibits their ability to pass through the ground. In addition, the attachment members which hold these wear caps in place are typically secured to the ripper shanks by means of a locking pin which passes through the upper portions of the shanks proximate the ripper box. As this portion of the ripper shank experiences the greatest stress during use, these mounting holes create stress points which have lead to fracturing of the shanks.

It would be highly desirable to provide a wear cap for ripper shanks which reduce the wear on the shanks without increasing the drag of the shanks through the ground and without weakening the shanks. It would also be highly desirable to provide such a protective wear cap which cooperates with the ripper tooth so as to reduce the drag normally associated with unprotected conventional shanks. The ripper shank and wear cap configurations of the present invention achieve these results.

SUMMARY OF THE INVENTION

Briefly, the present invention comprises a substantially "J"-shaped ripper shank adapted to be secured to a conventional ripper box and carry a ripper tooth at the lower forward end thereof, and an elongated wear cap carried by the forward edge of the shank proximate the tooth and having a transversed dimension substantially equal to the width of the ripper shank. The forward edge of the shank defines a continuous curvilinear transversed rib adapted to be received in a corresponding configured channel in the rear portion of the wear cap such that upon the wear cap being transversely slided over the rib, the sides of the wear cap are substantially flush with the sides of the ripper shank and the wear cap is held against the forward wall surface of the shank. To prevent lateral movement of the wear cap with respect to the shank, the lower end of the wear cap is secured adjacent a lower portion of the shank within the tapered cavity in the rearward portion of the ripper tooth. The upper end of the wear cap is restrained against lateral movement by a generally "U"-shaped securement bracket which is carried by the wear cap and extends about lateral portions of the side of the ripper shank. The forward facing surface of the wear cap is tapered to cooperate with a corresponding taper in the upper surface of the ripper tooth to facilitate movement of the tooth and shank through the ground during use.

It is the principal object of the present invention to provide an improved assembly for the mounting of ripper teeth on earth excavation equipment.

It is another object of the present invention to provide a mounting assembly for ripper teeth which reduces the wear on the tooth carrying ripper shanks during use.

It is yet another object of the present invention to provide a mounting assembly for ripper teeth which reduces the drag of the ripper shanks to which the teeth are secured as the shank is pulled through the ground during use.

It is still a further object of the present invention to provide a mounting assembly for ripper teeth which reduces the wear on the tooth carrying shanks during use without weakening the shanks.

It still a further object of the present invention to provide an improved protective wear cap for ripper shanks which is of simple construction and economical to manufacture.

These and other objects and advantages of the present invention will become readily apparent from the following detailed description taken in conjunction with the accompanying drawings.

DESCRIPTION OF THE PREFERRED EMBODIMENT IN THE DRAWINGS

FIG. 1 is a partial side view of the attachment assembly of the present invention.

FIG. 2 is a sectional view taken along the line 2—2 of FIG. 1.

FIG. 3 is a perspective view of the ripper shank of the present invention.

FIG. 4 is a perspective view of the wear cap of the present invention.

FIG. 5 is a perspective view of a ripper tooth used in the present invention.

FIG. 6 is a sectional view taken along the line 6—6 of FIG. 1.

Referring now in detail to the drawings, the assembly of the present invention comprises a ripper tooth 10, a substantially flat ripper shank 12, an elongated wear cap 14 and a securement member 16. The ripper shank 12 is constructed of alloy steel and can be of a cast, fabricated or forged construction. Ripper shank 12 is substantially "J"-shaped and defines a lower forwardly projecting end portion 18 which carries the ripper tooth 10, an upper end portion 20 which is secured in a conventional manner by a wedge key or pin to the ripper box (not shown), a forwardly facing end surface 22 and parallel sides 24. An aperture 25 is provided in the upper end portion 20 of the shank for such securement and a standard lifting eye 27 can be provided at the upper end of the shank. The forward end surface 22 of shank 12 defines a continuously curvilinear securement rib 26 integrally formed therewith and projecting therefrom proximate the lower end portion 18 of the shank for carrying the elongated wear cap 14.

The securement rib 26 on shank 12 extends laterally across the forward end surface 22 of the shank and defines a lower concave surface 28 which merges into surface 22 and into a lower convex surface 30. Surface 30 merges into an arcuate spanning portion 32 which in turn merges into an upper convex surface 34. Surface 34 merges into an upper concave surface terminating in the forward surface 22 of the ripper shank 12, thereby defining a pair of curvilinear undercut portions 33 and 35 adjacent the upper and lower ends of the rib 26. An aperture 36 extends transversely through the ripper shank 12 in the lower end portion 18 thereof which is adapted to receive a roll or a flex pin 38 for the securement thereto of tooth 10.

The protective wear cap 14 is also constructed of alloy steel, is of the same transverse dimension as the ripper shank 12 and defines a tapered front surface 40, a rearwardly offset lower curvilinear portion 42 terminating in an end 44 adjacent the lower end portion 18 of the ripper shank, and a rear surface 46. Rear surface 46 defines a lower curvilinear portion 48, an upper portion 50, an open ended transversed slot 52 in portion 50, and an open ended channel 54 disposed between portions 48 and 50. Channel 54 is defined by the rear surface 46 of the wear cap and shaped so as to receive the securement rib 26 therein upon the wear cap 14 being slided transversely thereover. As seen in FIG. 1, upon sliding the wear cap 14 over rib 26 such that the rib is received within channel 54, the curvilinear rear surface 46 of wear cap 14 is disposed continually adjacent the forward end surfaces defined by the shank 12 and is held there by the mating configurations of the securement rib 26 and channel 54.

The ripper tooth 10 has substantially parallel side wall portions 60 which terminate in slightly tapered forward side portions 62 which taper more sharply at 64 to a point 65. The upper surface of the tooth defines a tapered digging rib 66 which flares outwardly at 67 and extends to the side wall portions adjacent the base 68 of the tooth 10. The tooth 10 also defines a tapered cavity 70 in the rear portion thereof, oppositely aligned apertures 72 in the side wall portions 60 communicating with cavity 70, and a beveled surface 74 in the upper portion of base 68 of the tooth at the entrance to cavity 70. As seen in FIG. 1, the lower end portion 18 of ripper shank 12 and the adjacently disposed lower end portion 44 of the wear cap 14 project into cavity 70 in the tooth in a mating fitment such that the aperture 36 in the end portion of the shank is aligned with apertures 72 in the base of the tooth. The roll or flex pin 38 projects through aligned apertures 36 and 70, securing the tooth to the shank and holding the forward lower end portion 44 of the wear cap 14 within cavity 70 to prevent relative lateral movement of the wear cap with respect to the shank and tooth. The apertures 70 in the tooth are preferably slightly elliptical or elongated to accommodate some rearward movement of the ripper tooth 10 relative to the shank 12 during use to avoid unduly stressing pin 38.

The upper portion of the wear cap 14 is restrained against a lateral movement with respect to the shank by means of securement member 16. Securement 16 is generally "U"-shaped and defines a tapered body portion 80 and parallel arm portions 82. Arm portions 82 are adapted to extend about the upper portion of the wear cap 14 and adjacent portions of the shank 12 and are provided with oppositely aligned apertures 84 therein. Upon disposing the body portion 80 of securement member 16 over the upper portions of the wear cap 14 and shank as seen in FIG. 1, the apertures 80 therein are aligned with the transversed slot 52 in the wear cap. By inserting a roll or flex pin or other suitable locking pin 81 through apertures 80 and slot 52, the securement member 16 is secured to the wear cap with the arm portions 82 of the securement member 16 preventing any relative lateral movement of the upper portion of the wear cap 14 with respect to the shank 12. If desired, and at the risk of weakening the shank, the arm portions 82 of securement member 16 could be extended such that the apertures 84 therein could be aligned with a transversed aperture in the shank so as to secure the securement member 16 to the shank 12 as opposed to the wear cap 14.

Through the aforesaid configuration, the wear cap 14 protects the forward end surface 22 of the ripper shank 12 without increasing the thickness of the shank in the area adjacent the ripper tooth and thereby avoids any increase in drag. In fact, the tapered front digging surface 40 of the wear cap 14 which is axially aligned with and angularly disposed with respect to the tapered flared digging rib 66 on the upper surface of the ripper tooth 10, cooperates with rib 66 to cut to through the ground more efficiently than ripper shanks carried by conventional unprotective ripper shanks. The aforesaid assembly also allows the wear cap and/or ripper tooth to be easily removed from the ripper shank for replacement when necessary.

Various changes and modifications may be made in carrying out the present invention without departing from the spirit and scope thereof. Insofar as these changes and modifications are within the purview of the appended claims, they are to be considered as part of present invention.

We claim:

1. An attachment assembly for securing a ripper tooth having an open cavity in the base thereof to an earth excavation device, said assembly comprising:

a substantially "J"-shaped ripper shank defining a lower forwardly projecting tapered end portion, an upper end portion, a front end wall and a pair of side walls, said lower end portion being adapted to project into the cavity in the ripper tooth for carrying said tooth thereon and defining means for securing the tooth about said lower end portion, said upper end portion defining means for securing said shank to the earth excavation device, and said front end wall defining a forwardly projecting elongated securement rib having substantially opposed curvilinear undercut portions adjacent the upper and lower ends thereof;

an elongated wear cap adapted to be carried by and engage said ripper shank, said cap defining a tapered front digging surface, a tapered lower end portion, an upper end portion, and a rear surface, said tapered lower end portion being adapted to be disposed adjacent said lower end portion of said shank and project into the cavity in the tooth adjacent said shank and abut the tooth, and said rear surface being adapted to be disposed adjacent and mate with a portion of the front end wall of said ripper shank, said rear surface defining an open channel therein adapted to receive said securement rib upon said wear cap being transversely slided over said securement rib thereby preventing any forward movement of said wear cap with respect to said shank; and a securement member adapted to be secured over and about said upper end portion of said wear cap and portions of said side walls of said shank for preventing relative lateral movement of said wear cap with respect to said shank.

2. The attachment assembly of claim 1 including an open slot disposed in said rear surface of said wear cap in the upper end portion thereof and wherein said securement member defines spaced parallel arm portions having oppositely aligned apertures therein adapted to be aligned with said slot in said wear cap such that upon disposing said securement member over and about said upper end portion of said wear cap with said apertures therein in axial alignment with said slot and inserting a locking pin through said apertures and said slot, said securement member is secured to said wear cap and said arm portions prevent relative lateral movement of said wear cap with respect to said shank.

3. An attachment assembly for securing a ripper tooth having an open cavity in the base thereof to an earth excavation device, said assembly comprising:

a substantially "J"-shaped ripper shank defining a lower forwardly protecting tapered end portion, and upper end portion, a front end wall and a pair of side walls, said lower end portion being adapted to project into the cavity in the ripper tooth for carrying said tooth thereon and defining means for securing said shank to the earth excavation device, and said front end wall defining a forwardly protecting elongated securement rib having curvilinear undercut portions adjacent the upper and lower ends thereof;

an elongated wear cap adapted to be carried by and engage said ripper shank, said cap defining a tapered front digging surface, a tapered lower end portion, an upper end portion, and a rear surface, said tapered lower end portion being adapted to be disposed adjacent said lower end portion of said shank and project into the cavity in the tooth adjacent said shank and abut said tooth, said rear surface being adapted to be disposed adjacent and mate with a portion of a the front end wall of said ripper shank, said rear surface defining an open slot in the upper end portion of said cap and an open channel adapted to receive said securement rib upon said wear cap being transversely slided over said securement rib thereby preventing any forward movement of said wear cap with respect to said shank; and a securement member defining spaced parallel arm portions having oppositely aligned apertures therein adapted to be aligned with said slot in said wear cap and a body portion adjacent said arm portions, said body portion defining a tapered front digging surface such that upon disposing said arm portions about said upper end portion of said wear cap and a locking pin through said apertures in said arm portion and said slot in said wear cap, said securement member is secured to said wear cap, said digging surface on said securement member is aligned with said digging surface on said wear cap and said arm portions prevent relative lateral movement of said wear cap with respect to said shank.

4. An attachment assembly for securing a ripper tooth on an earth excavation device comprising:

a ripper tooth having a tapered cavity in the rear portion thereof and defining an abutment surface at the rearward end of said cavity and a tapered rib axially disposed on an upper surface of said tooth;

a substantially "J"-shaped ripper shank adapted to be carried by the earth excavation device and defining a lower forwardly projecting tapered end portion adapted to project into said cavity for carrying said tooth, a front end wall and a pair of side walls, said front end wall defining a forwardly projecting elongated securement rib spaced from said tapered end portion and having substantially opposed curvilinear undercut portions adjacent the upper and lower ends thereof;

an elongated wear cap adapted to be carried by and engage said ripper shank, said cap defining a tapered front digging surface adapted to be axially aligned with said tapered rib on said tooth, tapered lower end portion, an upper end portion, and a rear surface, said tapered lower end portion being adapted to be disposed adjacent said lower end portion of said shank and project into said cavity in the tooth between and against shank and said abutment surface on the tooth, said rear surface being adapted to be disposed adjacent and mate with a portion of the front end wall of said inner shank, said rear surface defining an open channel therein adapted to receive said securement rib upon said wear cap being transversely slided over said securement rib and further defining an open slot therein in said upper end portion thereof; and a securement member defining spaced parallel arm portions having oppositely aligned apertures therein, said member being adapted to be disposed over and about said upper end portion of said wear cap such that said arm portions extend about portions of said side walls of said shank and said apertures are axially aligned with said slot in said wear cap whereby upon disposing a locking pin through said apertures and said slot, said securement member is secured to said wear cap and said arm portions thereof prevent relative lateral movement between said wear cap and said shank.

5. An attachment assembly for securing a ripper tooth on an earth excavation device comprising:

a ripper tooth having a tapered cavity in the rear portion thereof and defining an abutment surface at the rearward end of said cavity and a tapered rib axially disposed on an upper surface of said tooth;

a substantially "J"-shaped ripper shank adapted to be carried by the earth excavation device and defining a lower forwardly projecting tapered end portion adapted to project into said cavity for carrying said tooth, a front end wall and a pair of side walls, said front end wall defining a forwardly projecting elongated securement rib spaced from said tapered end portion and having curvilinear undercut portions adjacent the upper and lower ends thereof;

an elongated wear cap adapted to be carried by and engage said ripper shank, said cap defining a tapered front digging surface adapted to be axially aligned with said tapered rib on said tooth, a tapered lower end portion, an upper end portion, and a rear surface, said tapered lower end portion being adapted to be disposed adjacent said lower end portion of said shank and project into said cavity in the tooth between and against shank and said abutment surface on the tooth, said rear surface being adapted to be disposed adjacent and mate with a portion of the front end wall of said inner shank, said rear surface defining an therein adapted to receive said securement rib being transversely slided over said securement rib and further defining an open slot therein in said upper end portion thereof; and a securement member defining spaced parallel arm portions having oppositely aligned apertures therein, and a body portion adjacent said arm portions, said body portion defining a tapered front digging surface, said securement member being adapted to being to be disposed about said upper end portion of said wear cap such that said arm portions extend about portions of said side walls of said shank and said apertures are axially aligned with said slot in said wear cap whereby upon disposing a locking pin through said apertures in said slot, said tapered front digging surface is aligned with said digging surface on said wear cap, said securement member is secured to said wear cap and said arm portions thereof prevent relative lateral movement between said wear cap and said shank.

6. An attachment assembly for securing a ripper tooth having an open cavity in the base thereof to an earth excavation device comprising:

a substantially "J"-shaped ripper shank defining a lower forwardly projecting tapered end portion, an upper end portion, a front end wall and a pair of oppositely disposed side walls, said front end wall defining an upper inclined surface on said tapered end portion, a forwardly projecting elongated curvilinear securement rib having substantially opposed curvilinear undercut portions adjacent the upper and lower ends of said rib, an arcuate surface extending upwardly from said upper inclined surface and merging into the curvilinear undercut portion adjacent the lower end of said rib, and an upper surface extending upwardly from said undercut portion adjacent the upper end of said rib;

an elongated wear cap adapted to be carried by and engage said ripper shank and abut the base of the ripper tooth, said cap defining a tapered front digging surface, a tapered lower end portion adapted to be disposed adjacent said inclined surface on said tapered end portion of said shank and project into the cavity in the tooth between said inclined surface and the base of the tooth, and a rear surface defining an open channel therein adapted to receive said securement rib and being configured so as to abut and mate with portions of said front wall of said shank such that upon said wear cap being transversely slided over said rib, the rear surface of said wear cap extends about said securement rib, projects into said undercut portions and bears against a portion of said inclined surface of said shank; and a securement member adapted to be disposed over and about a portion of said wear cap and portions of said side walls of said shank for preventing relative lateral movement of said wear cap with respect to said shank.

7. The attachment assembly of claim 6 wherein said rear surface of said wear cap defines a transverse slot therein spaced upwardly from said channel and said securement member defines spaced parallel arm portions having oppositely aligned apertures disposed therein such that upon disposing said arm portions about said wear cap and said portions of said side walls, aligning said apertures with said slot and inserting a locking pin through said apertures and said slot, said securing member is secured to said wear cap and said arm portions prevent relative lateral movement of said wear cap with respect to said shank.

8. The attachment assembly of claim 6 wherein said shank defines a constant transverse dimension and the transverse dimension of said wear cap is substantially equal to the transverse dimension of said shank.

9. An attachment assembly for securing a ripper tooth having an open cavity in the base thereof to an earth excavation device comprising:

a substantially "J"-shaped ripper shank defining forwardly projecting tapered end portion, an upper end portion a front end wall and a pair of oppositely disposed side walls, said front end wall defining an upper inclined surface on said tapered end portion, a forwardly protecting elongated curvilinear securement rib having curvilinear undercut portions adjacent the upper and lower ends of said rib, an arcuate surface extending upwardly from said upper inclined surface and merging into the curvilinear undercut portion adjacent the lower end of said rib, and an upper surface extending upwardly from said undercut portion adjacent the upper end of said rib;

an elongated wear cap adapted to be carried by and engage said ripper shank and abut the base of the ripper tooth, said cap defining a tapered front digging surface, a tapered lower end portion adapted to be disposed adjacent said inclined surface on said tapered end portion of said shank and project into the cavity in the tooth between said inclined surface and the base of the tooth, and a rear surface defining a transverse slot therein and an open channel disposed below said slot adapted to receive said securement rib, said rear surface being configured so as to abut and mate with portions of said front wall of said shank such that upon said wear cap being transversely slided over said rib, the rear surface of said wear cap extends about said securement rib, projects into said undercut portions and bears against a portion of said inclined surface of said shank; and a securement member defining spaced parallel arm portions having oppositely aligned apertures therein adapted to be aligned with said slot in said wear cap and a body portion disposed adjacent said parallel arm portions, said body portion defining a tapered frontal digging surface such that upon disposing said arm portions about said upper end portion of said wear cam and portions of said side walls of said shank and inserting a locking pin through said apertures in said arm portion and said slot in said wear cap, said securement member is secured to said wear cap, said digging surface on said securement member is aligned with said digging surface on said wear cap and said arm portions relative lateral movement of said wear cap with respect to said shank.

10. In an attachment assembly for securing a ripper tooth on an earth excavation device of the type including a substantially "J"-shaped ripper shank defining a forward surface, a pair of side walls, a lower forwardly projecting tapered end portion adapted to project in to a cavity in the rear portion of the tooth for carrying the tooth and means proximate the upper end thereof for securing the shank to the excavation device, the improvement comprising a wear cap adapted to be carried by and engage the forward surface of the shank so as to abut a rear portion of the tooth for reducing wear on the shank during use without increasing the drag of the assembly, said wear cap comprising:
a tapered front digging surface;
a tapered lower end portion adapted to be disposed adjacent the lower end portion of the ripper shank and project into the cavity in the tooth adjacent the shank and abut the rear portion of the tooth;
an upper end port ion; and
a rear surface defining an open channel therein having substantially opposed undercut portions and being adapted to receive a portion of said shank on the forward surface thereof such that upon sliding said wear cap transversely over said portion, said wear cap is substantially flush with the side walls of said shank, said surface is disposed adjacent and mates with the forward surface of said shank, and said tapered front digging surface is disposed perpendicularly to the side walls of said shank.

11. In an attachment assembly for securing a ripper tooth on an earth excavation device of the type including a substantially "J"-shaped ripper shank defining a forward surface, a pair of side walls, a lower forwardly projecting tapered end portion adapted to project into a cavity in the rear portion of the tooth for carrying the tooth and means proximate the upper end thereof for securing the shank to the excavation device, the improvement comprising a wear cap adapted to be carried by and engage the forward surface of the shank so as to abut a rear portion of the tooth for reducing wear on the shank during use without increasing the drag of the assembly, said wear cap comprising:
a tapered front digging surface;
a tapered lower end portion adapted to be disposed adjacent the lower end portion of the ripper shank and project into the cavity in the tooth adjacent the shank and abut the rear portion of the tooth;
an upper end portion; and
a rear surface defining an open channel therein adapted to receive a portion of said shank on the forward surface thereof, and an open slot therein in said upper end portion of said wear cap such that upon sliding said wear cap transversely over said portion of said shank, said wear cap is substantially flush with the side walls of said shank, said surface is disposed adjacent and mates with the forward surface of said shank, and said tapered front digging surface is disposed perpendicularly to the side walls of said shank, and including a securement member defining spaced parallel arm portions adapted to extend about said upper end portion of said wear cap and portions of the side walls of said shank, said arm portions having oppositely aligned apertures therein such that upon disposing securement member about said upper end portions of said wear cap, aligning said apertures with said slot and inserting a locking pin through said apertures and said slot, said securement member is secured to said wear cap and relative lateral movement between said wear cap and the shank is prevented.

12. A ripper tooth for use in an attachment assembly for securing the tooth to an earth excavation device of the type including a substantially "J"-shaped ripper shank defining a lower forwardly projecting tapered end portion for carrying the tooth and a wear cap carried by the front surface of the shank proximate the lower end portion thereof and defining a tapered front digging surface axially aligned with the shank and perpendicularly disposed with respect to the side walls of the shank, said tooth comprising a forward digging end, a rear end, a pair of side walls, an upper surface and a lower surface, said upper surface being inclined with respect to said lower surface and defining therebetween and within said side walls, a tapered cavity adapted to receive the lower end portion of the shank and a portion of the wear cap, said rear end of said tooth defining an inclined wear cap abutment surface adjacent said cavity adapted to abut and mate with a lower portion of the wear cap, and said upper surface of said tooth defining a centrally disposed upwardly tapered digging rib extending between said front end and said rear end of said tooth, said rib being adapted to be axially aligned with and angularly disposed with respect to the tapered digging surface on the wear cap upon said tooth and wear cap being secured to the shank, whereby said rib cooperates with the digging surface on the wear cap to facilitate passage of said assembly through the ground during use.

13. The tooth of claim 12 wherein said digging rib flares outwardly intermediary of the rear end and forward end of said tooth to said side walls proximate the rear end of said tooth, and including a pair of oppositely aligned apertures extending through said side walls for receiving a locking pin therein for securement of said tooth to the lower end portion of the shank.

14. An attachment assembly for securing a ripper tooth having an open cavity in the base thereof to an earth excavation device, said assembly comprising:
a substantially "J"-shaped ripper shank defining a lower forwardly projecting tapered end portion adapted to carry the ripper tooth thereon, an upper end portion defining means for securing said shank to the earth excavation device and a front end wall extending generally upwardly from said lower end portion and defining a forwardly projecting elongated securement rib having substantially opposed curvilinear undercut portions adjacent the upper and lower ends thereof, said front end wall being of a constant transverse dimension;
an elongated wear cap adapted to be carried by and engage said ripper shank, said cap defining a forward surface, a rear surface and a transverse dimension substantially equal to the transverse dimension of said front end wall of said shank, said rear surface being adapted to be disposed adjacent and mate with at least a portion of said front end wall of said ripper shank and defining an open channel therein adapted to receive said securement rib and opposed curvilinear projecting portions adapted to extend into said curvilinear undercut portions of said shank upon said wear cap being transversely slided over said securement rib thereby preventing any forward movement of said wear cap with respect to said shank; and a securement member adapted to be secured over and about said upper portion of said wear cap and portions of said side walls of said shank for preventing relative lateral movement of said wear cap with respect to said shank.

15. The attachment assembly of claim 14 including an open slot disposed in said rear surface of said wear cap in the upper end portion thereof and wherein said securement member defines spaced parallel arm portions having oppositely aligned apertures therein adapted to be aligned with said slot in said wear cap such that upon disposing said securement member over and about said upper end portion of said wear cap with said apertures therein in axial alignment with said slot and inserting a locking pin through said apertures and said slot, said securement member is secured to said wear cap and said arm portions prevent relative lateral movement of said wear cap with respect to said shank.

16. The attachment assembly of claim 15 wherein said securement member defines a body portion adjacent said arm portions, said body portion defining a tapered front digging surface, said surface being aligned with said digging surface on said wear cap upon said securement member being secured to said wear cap.

* * * * *